United States Patent [19]
Fey

[11] Patent Number: 5,366,807
[45] Date of Patent: Nov. 22, 1994

[54] PRIMER COMPOSITION, COATING METHOD AND COATED SILICONE SUBSTRATES

[75] Inventor: Kenneth C. Fey, Midland, Mich.

[73] Assignee: Dow Corning Corporation, Midland, Mich.

[21] Appl. No.: 75,269

[22] Filed: Jun. 11, 1993

Related U.S. Application Data

[62] Division of Ser. No. 283,334, Dec. 12, 1988, Pat. No. 5,248,334.

[51] Int. Cl.$^5$ .............................................. B32B 27/40
[52] U.S. Cl. ................... 428/425.5; 428/447; 427/384; 427/387; 427/407.1
[58] Field of Search ............... 428/447, 425.5; 427/387, 384, 407.1

[56] References Cited

U.S. PATENT DOCUMENTS

| | | |
|---|---|---|
| 3,477,901 | 11/1969 | Keil . |
| 3,542,714 | 11/1970 | Meffers . |
| 3,554,952 | 1/1971 | Plueddemann . |
| 3,812,164 | 5/1974 | Schulz . |
| 3,888,815 | 6/1975 | Bessmer . |
| 3,957,714 | 5/1976 | Clark . |
| 4,154,638 | 5/1979 | Franz ............................ 106/287.11 |
| 4,315,970 | 2/1982 | McGee ................................ 428/412 |
| 4,593,065 | 6/1986 | Fukayama et al. ................. 524/860 |
| 4,681,808 | 7/1987 | Lefler ................................ 428/425.5 |
| 4,743,503 | 5/1988 | Lin et al. .............................. 428/447 |

FOREIGN PATENT DOCUMENTS

| | | |
|---|---|---|
| 2943832 | 4/1982 | Germany . |
| 63-09767 | 4/1988 | Japan . |
| 2039231 | 8/1980 | United Kingdom . |
| 2056473 | 3/1981 | United Kingdom . |

*Primary Examiner*—Ralph H. Dean
*Attorney, Agent, or Firm*—Robert L. McKellar

[57] ABSTRACT

A novel primer composition containing an aminoalkyl-substituted trialkoxysilane, a solvent, a carboxylic acid salt of tin and, optionally, an amine-containing organic compound, is applied to a cured silicone substrate and dried to improve the adhesion of a subsequently applied coating. The composition and method are of particular value for painting an elastomeric coating filled with an iron filler.

9 Claims, No Drawings

PRIMER COMPOSITION, COATING METHOD AND COATED SILICONE SUBSTRATES

BACKGROUND OF THE INVENTION

The Government has rights in this invention pursuant to Contract No. F33615-83-C-5084 awarded by the Department of the Air Force.

This is a divisional of copending application(s) Ser. No. 07/283,334 filed on Dec. 12, 1988, now U.S. Pat. No. 5,248,334.

The present invention relates to a composition and a method for priming and coating a cured silicone substrate, and to the coated substrate obtained therefrom. More specifically, the present invention relates to a method comprising treating the surface of a cured silicone substrate with a new primer composition and thereafter applying a coating composition to the primed surface to provide a silicone substrate having a durably adhered coating composition.

Silicone substrates comprising a cured silicone polymer typically have low surface energies and organic overcoatings, such as paints, do not wet the surface of the silicone substrate well. Consequently, a poorly or non-adhering overcoating results when one attempts to simply coat a silicone substrate with an organic material.

Several attempts to solve this problem have been disclosed in the art, all involving the mixing of an additional component, typically called an adhesion promoter or a primer or a paintability component, into a curable silicone composition prior to its being applied and cured.

For examples, U.S. Pat. Nos. 3,542,714; 3,812,164; 4,593,065; and 3,957,714 recognize the paintability problem associated with a cured silicone surface and disclosed the addition of rosin, amidoalkylthioalkyl-substituted alkoxysilanes, aminoxy- and/or amido-substituted silicon compounds and calcium carbonate, respectively, to curable silicone compositions to improve the paintability of the composition once it has been cured. U.S. Pat. No. 3,817,894 discloses a silicone latex caulk comprising an aminofunctional silane which is said to function as a crosslinking agent and as a curing catalyst for the siloxane copolymer component of the composition. When cured the composition has good paintability with latex or oil-based paints.

The above method of achieving paintability of a cured silicone surface has drawbacks. For example, one must mix the additional component into the silicone composition before the composition is cured. Consequently, this method is of no value when one wishes to paint an already-cured silicone substrate. Furthermore, the mixing of an additional component into a formulated silicone composition may alter the physical properties of the curable and/or cured composition in an undesirable way, even though achieving the desired paintability.

Amino-functional silicon compounds have been used to improve the adhesion of various materials to a cured silicone coating; however, it appears that such a use has not been extended to the coating of a silicone substrate. For example, U.S. Pat. No. 4,315,970 claims a method for forming an adherent metal surface on a substrate by treating the substrate with a curable organic or silicone basecoat, curing said basecoat, treating the cured basecoat with at least one organofunctional silane or partial hydrolyzate thereof, drying the silane-treated surface and vapor-depositing a metal on the silane-treated surface. The organofunctional silane has the formula $(RO)_aSI(R)_cR'X$ wherein $-R'X$ can be, for example, $-CH_2CH_2CH_2NHCH_2CH_2NH_2$, and the basecoat is preferably a silicone basecoat and more preferably a basecoat selected from the siloxane coatings disclosed in U.S. Pat. No. 3,986,997. Also, U.S. Pat. No. 3,477,901 discloses a method for adhering a polyolefin to a substrate comprising treating the substrate with a mixture of silanes, one of which is an amino-functional silane, drying the treated substrate and bonding the polyolefin to the dried substrate using heat and pressure. The substrate can be, for example, a silicone-treated parchment paper.

These methods of overcoating comprising the use of vapor deposition, mechanical pressure or other complex means are not suitable for the coating of silicone substrates that one would likely coat by a painting method.

Amino-functional silicon compounds have been used extensively to improve the adhesion of a curable silicone composition to various substrates, such as glass, metal, fillers, etc. Mention is made of U.S. Pat. Nos. 3,554,952; 3,888,815 and 4,681,808, the latter disclosing a method for improving the adhesion of a silicone elastomeric coating to a polyurethane substrate comprising applying to the polyurethane substrate a limited amount of a silane having the formula $ZSi(OR)_3$, where Z is an amine-functional radical and R is a monovalent hydrocarbon radical having from 1–6 carbon atoms, and then applying a coating of a specific curable silicone coating to the thus-treated polyurethane substrate.

There is a need for a method for overcoating a silicone substrate, particularly a coating form thereof, with a durably adhering overcoating, such as a protective and/or decorative paint, which does not require the mixing of a component with the silicone prior to its conversion to a solid or the using of complex overcoating methods, such as vapor deposition or mechanical pressure.

BRIEF SUMMARY OF THE INVENTION

It is an object of the present invention to provide a method for overcoating a silicone substrate with a durably adhering material. More particularly, it is a further object of this invention to provide a method for coating a silicone substrate with a curable liquid composition which will not adheringly separate from the substrate after it has been applied and cured. In a preferred embodiment of this invention it is an object to provide a method for painting an iron-filled silicone coating with a protective paint. It is also an object of this invention to provide a primer composition for priming the surface of a cured silicone substrate.

These objects, and other which will occur to one of ordinary skill in the silicone coatings art, are obtained by the composition and method of this invention which, briefly described, comprises applying a continuous layer of a new primer composition to a silicone substrate, evaporating the solvent from the continuous layer and applying an coating composition thereover. Particular attention is devoted to insuring that the layer of adhesion promoter solution is continuous.

DETAILED DESCRIPTION OF THE INVENTION

In a first aspect the present invention relates to a primer composition consisting essentially of a primer component and a solvent component, said primer component consisting essentially of an aminoalkyl-substituted trialkoxysilane, a carboxylic acid salt of tin and, optionally, an organic amine compound selected from the group consisting of alkanolamines and polyamines; the weight ratio of aminoalkyl-substituted trialkoxy silane to carboxylic acid salt of tin having a value of from 5/1 to 20/1 and the weight ratio of organic amine compound to aminoalkyl-substituted trialkoxysilane having a value of from 0/1 to 1/1.

The primer component of the primer composition of this invention serves to improve the adhesion of a coating to the surface of a cured silicone composition when used in the method of this invention.

The aminoalkyl-substituted component of the primer composition can be any silane, or mixture of silanes, having the formula R'NHRSi(OZ)$_3$; herein also referred to as the silane.

Examples of suitable aminoalkyl radicals, —RNHR', of the silane include radicals wherein R is any divalent hydrocarbon radical or a divalent hydrocarbon radical having amino functionality of the formula =NH in which the two bonds of the =NH are bonded to carbon atoms and R' is hydrogen or an alkyl radical having from 1 to 4 carbon atoms per radical, such as methyl, ethyl, propyl, isopropyl, butyl, and isobutyl.

Examples of the R divalent hydrocarbon radicals include methylene, ethylene, the propylenes, the butylenes, the hexylenes, cyclohexylene, and the decylenes.

Examples of the R divalent hydrocarbon radical having amino functionality of the formula =NH in which the two bonds of the =NH are bonded to carbon atoms include —CH$_2$CH$_2$CH(CH$_3$)NHCH$_2$CH$_2$—,
—CH$_2$CH(CH$_3$)NHCH$_2$CH$_2$—,
—CH$_2$CH(CH$_3$)CH$_2$NHCH$_2$CH$_2$—,
—CH$_2$CH$_2$CH$_2$NHCH$_2$CH$_2$—,
—CH$_2$CH$_2$CH$_2$(NHCH$_2$CH$_2$)$_2$—, and
—CH$_2$CH(CH$_3$)CH$_2$(NHCH$_2$CH$_2$)$_2$—.

The -OZ radicals of the silane can be any alkoxy or substituted alkoxy radical having from 1–8 carbon atoms, such as methoxy, ethoxy, propoxy, butoxy, 2-ethylhexoxy, isopropoxy, hexyloxy, 2-methoxyethoxy and 2-ethoxyethoxy.

Examples of aminoalkyl-substituted trialkoxysilanes suitable for use in the compositions of this invention include beta-aminoethyltriethoxysilane,
beta-aminopropyltriethoxysilane,
gamma-aminopropyltrimethoxysilane,
gamma-aminopropyltripropoxysilane,
gamma-aminopropyltri(methoxyethoxy)silane,
N-methyl-gamma-aminopropyltrimethoxysilane,
delta-aminobutyltrimethoxysilane,
(CH$_3$O)$_3$SiCH$_2$CH(CH$_3$)CH$_2$NHCH$_2$CH$_2$NH$_2$,
(CH$_3$O)$_3$SiCH$_2$CH$_2$CH$_2$NHCH$_2$CH$_2$NH$_2$,
(CH$_3$O)$_3$SiCH$_2$CH$_2$CH$_2$(NHCH$_2$CH$_2$)$_2$NH$_2$, and
(CH$_3$O)$_3$SiCH$_2$CH$_2$CH$_2$(NHCH$_2$CH$_2$)$_3$NH$_2$.

Aminoalkyl-substituted trialkoxysilanes are well known in the silicone art and need no detailed description herein as to their preparation. Some are commercially available.

The carboxylic acid salt of tin component of the primer composition can be any carboxylate of tin or alkyltin. Carboxylic acid salts of tin are well known as silanol-condensing catalysts in the silicone art, such as in the moisture curable silicone coating art, and need no delineation herein. Many are commercially available. They are exemplified by dibutyltin diacetate, dibutyltin dilaurate, stannous octoate, dibutyltin di(2-ethylhexoate), and the like.

The organic amine compound of the primer composition can can be any of the well-known alkanolamines, examples of which include triethanolamine, diethanolamine, isopropanolamine, dimethylaminoethanol and diisopropanolamine; and polyamines, such as diethylenetriamine, ethylenediamine and triethylenetetraamine.

The solvent component of the primer composition serves to dilute the primer component for subsequent application to a substrate and, with certain solvents, to aid in wetting a substrate. The solvent component is volatile and can be a single compound or a mixture of compounds which dissolves the primer component, delineated above. By volatile it is meant that each compound of the solvent has a normal boiling point sufficiently low so as to allow it to evaporate substantially completely from a thin layer of the primer composition at room temperature and pressure within a few hours, preferably within an hour or less, after being applied to the substrate.

Examples of solvent compounds suitable for use in this invention include alcohols, such as methanol, ethanol, the propanols, the butanols and the cyclic and acyclic hexanols; hydrocarbons, such as the cyclic and acyclic pentanes, hexanes and heptanes, benzene, toluene, the xylenes and mineral spirits; halogenated hydrocarbons, such chlorothene and methylene chloride; cyclic and acyclic hydrocarbon and glycol ethers; and siloxanes, such as hexamethyldisiloxane. Preferably the solvent component of the primer composition comprises one or more alcohols and, most preferably, only the alcohols.

The amount of primer component in the primer composition is not known to be critical and can range from 1 to 99 percent, preferably from 5 to 50 percent, based on the weight of the primer composition, and the amount of solvent component, and any other components which are typical components in primer compositions, comprises the balance of the primer composition.

A preferred primer composition of this invention consists essentially of from 10 to 15 percent by weight (MeO)$_3$SiCH$_2$CH$_2$CH$_2$NHCH$_2$CH$_2$NH$_2$, and the balance is dibutyltin diacetate and i-propanol, wherein the weight ratio of (MeO)$_3$SiCH$_2$CH$_2$CH$_2$NHCH$_2$CH$_2$NH$_2$ to dibutyltin diacetate has a value of from 5/1 to 20/1.

The primer composition can be prepared by any suitable means, such as for example, by merely mixing appropriate amounts the desired components. The primer composition should be maintained substantially anhydrous until it is to be used.

In a preferred embodiment the aminoalkyl-substituted trialkoxysilane and the carboxylic acid salt of tin are not mixed together until the primer composition is to be used. In such a case the primer composition consists essentially of a first composition containing all of the carboxylic acid salt of tin and, optionally, a portion of the solvent, and a second composition containing all of the aminoalkyl-substituted trialkoxysilane, the organic amine compound, if present, and the remaining portion of the solvent component. The first and second compositions are then mixed when desired. Alternatively, the organic amine compound can be placed in a third composition, optionally containing a portion of the solvent component, if desired, and the three compositions mixed when desired.

Thus, it is within the scope and spirit of this invention to store the aminoalkyl-substituted trialkoxysilane and carboxylic acid salt of tin in separate, but related, containers until one desires to use the primer composition. By separate, but related, containers it is meant any arrangement of two or more containers which will keep the aminoalkyl-substituted trialkoxysilane and the carboxylic acid salt of tin apart, but which clearly indicates that they are to be mixed together in preparation for using the primer composition of this invention.

Examples of separate, but related, containers include two or more bottles, cans, tubes, vials, drums, pails or etc. packaged together, such as in a box or on a pallet; two or more of said containers, including tankers and tank cars, bearing labels which relate the containers to each other; and a single package having two or more compartments which are separate containers but which can be caused to communicate, thereby mixing their contents. The reader will be able to contemplate other arrangements of separate, but related containers, which are included in the scope and spirit of this invention and which will provide the primer composition of this invention.

In a second aspect this invention relates to a method comprising applying a continuous layer of a primer composition to a cured silicone substrate, said primer composition consisting essentially of a primer component and a solvent component, said primer component consisting essentially of an aminoalkyl-substituted trialkoxysilane, a carboxylic acid salt of tin and, optionally, an organic amine compound selected from the group consisting of alkanolamines and polyamines; the weight ratio of aminoalkyl-substituted trialkoxy silane to carboxylic acid salt of tin having a value of from 5/1 to 20/1 and the weight ratio of organic amine compound to aminoalkyl-substituted trialkoxysilane having a value of from 0/1 to 1/1; and, evaporating the solvent from the continuous layer of primer composition to provide a primed silicone substrate.

In the method of this invention the primer composition of this invention delineated above, including preferred embodiments thereof, is applied to a cured silicone substrate, herein also referred to as a substrate.

The substrate that is treated by the method of this invention can be any solid substrate that is obtained by converting a liquid composition containing a siloxane polymer to the solid, i.e., non-liquid state, such as an elastomeric or rigid material. Examples of cured silicone substrates include sealants, caulks, glazings, encapsulants, adhesives, moldings, extrusions, foams and coatings.

For example the cured silicone substrate that is treated by the method of this invention can be any substrate that is obtained by exposing a moisture-curable silicone composition to moisture until its surface becomes tack-free. Typically the moisture-cured substrate is sufficiently cured to have a solid form, such as an elastomeric or rigid material.

Moisture-curable silicone compositions are well known in the silicones art and need no extensive delineation herein. Generally, moisture-curable silicone compositions are of the one-package type that are ready to use; they give off either an acid, typically acetic acid, or a non-acid, such as an alcohol or a ketoxime, while curing. The disclosures of U.S. Pat. Nos. 3,035,016; 3,184,427; 3,122,522; 3,766,127; 3,766,128; 3,061,565; 3,161,614; 3,077,465; 3,294,739; 3,175,993; 3,499,859; 3,109,013; and 4,595,610 are incorporated herein to show the types of moisture-curable silicone compositions that provide substrates which can be treated by the method of this invention.

Alternatively, the cured silicone substrate can be an addition-cured silicone substrate obtained by mixing a siloxane polymer containing olefinic unsaturation, a silicon compound containing silicon-bonded hydrogen atoms and a catalyst, such as a platinum compound and/or a peroxide compound; and allowing, or causing, the mixture to cure.

Addition-curable silicone compositions are well known in the silicones art and need no extensive delineation herein. Generally, addition-curable silicone compositions are of the one- or two-package type and they give off little or no reaction by-products while curing. The disclosures of U.S. Pat. Nos. 2,823,218; 2,915,497; 3,020,260; 3,284,406; 3,433,760; 3,445,420; 3,595,934; 3,627,851; 4,322,518; 4,537,829; and 4,731,191 are incorporated herein to show the types of addition-curable silicone compositions that provide substrates which can be treated by the method of this invention.

In a preferred embodiment the silicone substrate comprises a metallic filler consisting essentially of iron powder. The disclosures of U.S. Pat. No. 4,731,191; copending Ser. Nos. 815,436 and 815,437, filed on Dec. 31, 1985; and copending applications, filed on even date herewith titled "METHOD FOR STABILIZING COMPOSITIONS CONTAINING CARBONYL IRON POWDER" and "IMPROVED SILICONE COMPOSITIONS CONTAINING CARBONYL IRON POWDER"; all assigned to the assignee of this invention, are incorporated herein to teach how to prepare the preferred silicone substrates.

Any means, or combination of means, for applying the primer composition to the silicone substrate may be used as long as the primer composition layer is continuous, i.e. free of discontinuities, such as streaks or holes, commonly called "fish-eyes".

Typically the primer composition is brushed or sprayed onto the substrate and examined. If discontinuities exist in the applied composition rubbing and/or abrading of the silicone substrate is initiated.

In one aspect this invention comprises rubbing the surface of the substrate with an applicator, such as a cheesecloth swatch, while the primer composition is being applied to the substrate. Said rubbing is conducted with sufficient force and duration until the desired continuous layer of primer composition has been achieved.

In another aspect of this invention the surface of the substrate is abraded prior to, or during, the application of the primer composition. This abrading can be accomplished by any means with the proviso that it produces a surface which is equivalent to that obtained by rubbing the surface of the substrate with 240 grit sandpaper. By equivalent it is meant with respect to the loss of gloss from the surface of the substrate or with respect to the force necessary to remove a subsequently adhered overcoating material therefrom.

The thus-abraded surface typically can be described as having been deglossed, i.e., freed of the shiny surface that most cured silicone coatings typically display. The loss of gloss can be determined visually; however, any method may be used, such as by observation with a reflectometer.

For example, a glossy substrate can be rubbed with 240 grit sandpaper to remove the gloss, freed of any loose material, such as by cleansing with alcohol, and then brushed with the primer composition. If discontinuities in the layer of primer composition exist further rubbing with the sandpaper or with an applicator is done. Alternatively, the primer composition can be brushed onto a glossy substrate and rubbed with 240 grit sandpaper until a continuous layer of primer composition has been obtained.

Any solvent remaining in the continuous layer of primer composition after it has been applied to the surface of the silicone substrate is then allowed, or is caused to, evaporate substantially completely in the usual manner. The means of evaporating the solvent is not a critical element of the method of this invention. After the solvent has been removed from the continuous layer of primer composition the substrate is a primed substrate and is ready to receive a coating composition.

Thus, the method of this invention further comprises applying one or more applications of a coating composition to the primed substrate, if desired. The coating composition that is applied to the primed substrate can be, for example, any of the well known air-drying latex, silicone-alkyd or oil-based coatings that are suggested for indoor or outdoor use in the home and commercial construction industry. Additionally, the coating composition can be, for example, any of the coating composition that are used to protect, camouflage, identify and/or decorate military articles such as aircraft, ships, motor vehicles, weapons, buildings, and other structures.

In a preferred embodiment the coating composition is a polyurethane-containing composition. It is believed that a curable polyurethane-containing coating composition contains reactive moieties which bind the coating composition to the primed substrate and account for the excellent adhesion I have obtained by the method of this invention.

Additives can be added to the polyurethane coating, if desired, to improve the flow and drying of the coating composition and the appearance of the dried coating.

Polyurethane-containing coatings are well known in the organic coatings art and need no extensive delineation herein. Many are commercially available. The polyurethane can be a storage-stable composition which cures by oxidation, heat or moisture-contact; or it can be of a composition which is catalyst-cured and is formulated shortly before use.

The coating composition can be applied to the primed substrate at any time after the applied primer composition has dried, typically at least 30 minutes after it has been applied to the silicone substrate. The primed surface of the substrate should be protected from damage, such as from contamination by, for example, oils and dirt, and/or from partial or complete removal by, for example, abrasion, until it is overcaoted.

The composition and method of this invention provides an article comprising a cured silicone substrate bearing a coating composition durably adhered thereto with a continuous primer layer consisting essentially of the composition obtained by drying a primer composition consisting essentially of a primer component and a solvent component, said primer component consisting essentially of an aminoalkyl-substituted trialkoxysilane, a carboxylic acid salt of tin and, optionally, an organic amine compound selected from the group consisting of alkanolamines and polyamines; the weight ratio of aminoalkyl-substituted trialkoxy silane to carboxylic acid salt of tin having a value of from 5/1 to 20/1 and the weight ratio of organic amine compound to aminoalkyl-substituted trialkoxysilane having a value of from 0/1 to 1/1.

The cured silicone substrate, the primer composition and the coating composition of the article of this invention are to be selected from any of those disclosed above, including preferred embodiments thereof.

The cured silicone substrate that has been primed and coated by the method of this invention can be unsupported, such as a molded or extruded silicone article, or disposed on a support. The support can be made of any useful material, such as cellulosic, such as wood or cotton; metallic, such as aluminum, copper, steel, titanium, brass or iron; plastic, such as vinyl, polyester or nylon; siliceous, such as glass, cement, brick, mortar, concrete, and combinations thereof; and can take any form, such as a building component, such as a window assembly, a fabricated metal surface or plumbing fixture; an encapsulated and/or sealed electrical and/or electronic device, such as a circuit board, a microcircuit, a switch or a military "black box"; or a work of art or handicraft.

The continuous primer layer that one obtains by drying a primer composition of this invention is a complex material consisting essentially of aminoalkyl radicals, as delineated above, bonded to silicon atoms, and compounds of tin. Additionally, it is believed that the silicon atoms of the primer layer are bonded, to a greater extent, to the surface of the silicone substrate, and to a lesser extent, to each other by way of silioxane bonds; thereby providing a primer layer which has some siloxane character but which is, to a slight degree, absorbed by the silicone substrate. Small amounts of silicon-bonded hydroxyl radicals may also be present in the primer layer.

The following examples are disclosed to further teach how to practice, but not to limit, the present invention which is properly delineated by the claims appended hereto.

Adhesion of a coating to a primed silicone elastomeric substrate was measured by one or more of the following tests.

The Cross Hatch test consisted of cutting, through the coating and into the substrate, a 10×10 grid measuring 1 inch on a side and containing 100 −0.1×0.1 inch squares. A piece of masking tape was firmly applied to the squares and peeled off at an angle of 180° (O radians) to the surface. The number of 0.1 inch squares remaining on the substrate was counted and was expressed as a percentage of the total number of squares covered by the masking tape.

The Keil Test consisted of cutting a 1 inch wide strip in the coating and pulling the coating from the primed substrate at a rate of 12 inches/minute using a Keil Tester, which is described in TAPPI, vol. 43, No. 8. pages 164A and 165A (August 1960).

All parts, percentages and ratios are by weight, unless stated otherwise. DBTDA denotes dibutyltin diacetate.

Examples 1–3

Three primer compositions of this invention (A, B, and C) were prepared by preparing a first solution containing 19.8 parts of $(CH_3O)_3$-$SiCH_2CH_2CH_2NHCH_2CH_2NH_2$ and 80.2 parts of isopropyl alcohol and three second solutions containing 3.96, 1.98 and 0.99 parts, respectively, of dibutyltin diacetate (DBTDA) and 98.02 parts of isopropyl alcohol. When the primer compositions were needed a first solution and a second solution were mixed in a 1/1 ratio. Each primer composition contained 9.9% silane. Primer Composition A also contained 1.98% DBTDA. Primer Composition B also contained 0.99% DBTDA. Primer Composition C also contained 0.49% DBTDA.

Examples 4–9

Six primer compositions of this invention (D, E, F, G, H and I) were prepared by preparing a first solution containing 19.8 parts of $(CH_3O)_3$-$SiCH_2CH_2CH_2NHCH_2CH_2NH_2$ and 80.2 parts of isopropyl alcohol; a second solution containing 3.96 parts of dibutyltin diacetate (DBTDA) and 98.02 parts of isopropyl alcohol and six third solutions containing 19.8 parts of an organic amine compound and 80.2 parts of isopropyl. When a primer composition was needed a first, second and third solution were mixed in a 1/1/1 ratio to provide a primer composition containing 6.60% silane, 6.60% organic amine compound and 1.33% DBTDA. The primer composition designation and its corresponding organic amine component were as follows: D-isopropanolamine, E-diisopropanolamine, F-dimethyl aminoethanol, G-triethanolamine, H-diethanolamine, I-diethylenetriamine.

EXAMPLE 10

A substrate consisting of an alcohol-releasing, moisture-curing, iron-filled silicone caulk which had been cured for 24 hours at room temperature was deglossed by rubbing its surface with 240 grit sand paper and was then freed of debris with an i-propanol rinse. After being air-dried a portion of the rinsed surface was wiped with a 24-hour old primer composition of this invention containing 1 part of $(CH_3O)_3$-$SiCH_2CH_2CH_2NHCH_2CH_2NH_2$, 9 parts of isopropanol and 0.1 part of DBTDA to provide a continuous layer of primer composition. Another portion of the rinsed surface was wiped with a freshly mixed primer composition of this invention containing 1 part of $(CH_3O)_3SiCH_2CH_2CH_2NHCH_2CH_2NH_2$, 9 parts of isopropanol and 0.1 part of DBTDA. As a comparison another portion of the rinsed surface was treated identically, but with a freshly mixed solution containing 80.2 parts of isopropyl alcohol and 19.8 parts of $(CH_3O)_3$-$SiCH_2CH_2CH_2NHCH_2CH_2NH_2$. The primed substrate was allowed to dry for 15 minutes and was then overcoated with a two-part epoxy/isocyanate coating composition identified as IFT COATING 34096 DARK GREEN and IFT CURING SOLUTION, available from Desoto, Inc. of Des Plaines, Ill. The overcoat was allowed to cure at room temperature for 1 day and was then tested for adhesion by the Cross-Hatch Test. The freshly prepared primer composition of this invention provided a value of from 90–95% adhesion while the 24-hour old primer composition provided a value of 95–100% adhesion. The comparison composition provided a value of from 80–85% adhesion.

EXAMPLE 11

Six samples of platinum-catalyzed, iron-filled, addition-cured, molded sheet, disclosed in my copending application titled "IMPROVED SILICONE COMPOSITIONS CONTAINING CARBONYL IRON POWDER" were glued to aluminum supports using DOW CORNING(R) 3145 RTV, available from the Dow Corning Corporation, Midland, Mich., and the exposed surface of each molded sheet was deglossed and rinsed as in Example 10. Each deglossed and rinsed surface was primed with a continuous layer of one of Primer Compositions A-I within 30 minutes of its separate solutions being mixed, and the applied primer composition was allowed to dry at room temperature for 15–20 minutes before being spray-coated with a solution of 208.34 parts of a one-part urethane composition identified as IMPROVED KOROFLEX PRIMER, available from DESOTO, INC. of Des Plaines, Ill. and 20.8 parts of Mil-T-81772A thinner. The urethane overcoat was allowed to dry for 15 days at 72° F. and the resulting article was then tested for adhesion of the urethane overcoat to the primed silicone substrate, using the Keil tester. All articles separated cohesively, except that prepared with Primer Composition I, which separated adhesively. The primer composition designation and its corresponding adhesion value, in grams/inch, were as follows: A/575-625, B/725-775, C/700-750, D/525-550-E/500-550, F/500-525, G/500-525, H/500-550, I/350-550. When the urethane overcoat is applied to the unprimed molded silicone substrate the resulting adhesion is less than 100 g/in.

That which is claimed is:

1. An article comprising a cured silicone substrate bearing a coating composition durably adhered thereto with a continuous primer layer consisting essentially of the composition obtained by drying a primer composition consisting essentially of a primer component and a solvent component, said primer component consisting essentially of an aminoalkyl-substituted trialkoxysilane, a carboxylic acid salt of tin and, optionally, an organic amine compound selected from the group consisting of alkanolamines and polyamines; the weight ratio of aminoalkyl-substituted trialkoxy silane to carboxylic acid salt of tin having a value of from 5/1 to 20/1 and the weight ratio of organic amine compound to aminoalkyl-substituted trialkoxysilane having a value of from 0/1 to 1/1.

2. The article according to claim 1 wherein the primer composition consists essentially of from 10 to 15 percent by weight $(CH_3O)_3$-$SiCH_2CH_2CH_2NHCH_2CH_2NH_2$, and the balance is dibutyltin diacetate and i-propanol, wherein the weight ratio of $(CH_3O)_3SiCH_2CH_2CH_2NHCH_2CH_2NH_2$ to dibutyltin diacetate has a value of from 5/1 to 20/1.

3. The article according to claim 1 wherein the coating composition comprises a polyurethane.

4. The article according to claim 1 wherein the cured silicone substrate comprises an iron filler.

5. "A method of applying a continuous layer of a primer composition to a cured silicone substrate, said method comprising (I) applying said primer compostion to said substrate, the primer composition consisting essentially of a primer component and a solvent component, said primer component consisting essentially of an aminoalkyl-substituted trialkoxysilane, a carboxylic acid salt of tin and, optionally, an organic amine compound selected from the group consisting of alkanolamines and polyamines; the weight ratio of aminoalkyl-substituted trialkoxy silane to carboxylic acid salt of tin having value of from 5/1 to 20/1 and the weight ratio of organic amine compound to aminoalkyl-substituted trialkoxysilane having a value of from 0/1 to 1/1; and, (II) evaporating the solvent from the continuous layer of primer composition to provide a primed silicone substrate."

6. A method according to claim 5 wherein the primer composition consists essentially of from 10 to 15 percent by weight $(CH_3O)_3SiCH_2CH_2CH_2NHCH_2CH_2NH_2$, and the balance is dibutyltin diacetate and i-propanol, wherein the weight ratio of $(CH_3O)_3SiCH_2CH_2CH_2NHCH_2CH_2NH_2$ to dibutyltin diacetate has a value of from 5/1 to 20/1.

7. A method according to claim 5 further comprising applying a coating composition to the primed substrate.

8. A method according to claim 7 wherein the coating composition comprises a polyurethane.

9. A method according to claim 5 wherein the cured silicone substrate comprises an iron filler.

* * * * *